J. BOWMAN & S. C. IRVING.
ANIMAL-STOCKS.
No. 192,672. Patented July 3, 1877.
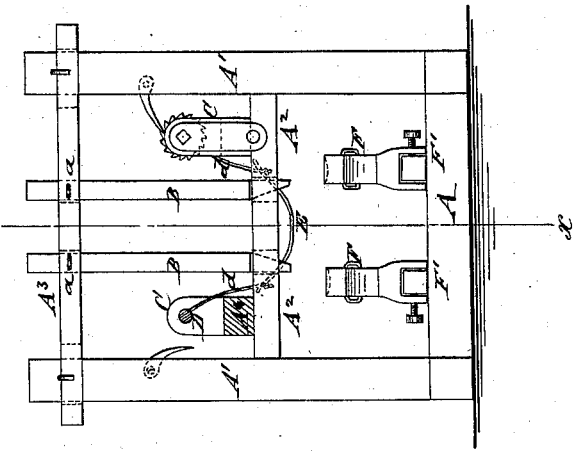
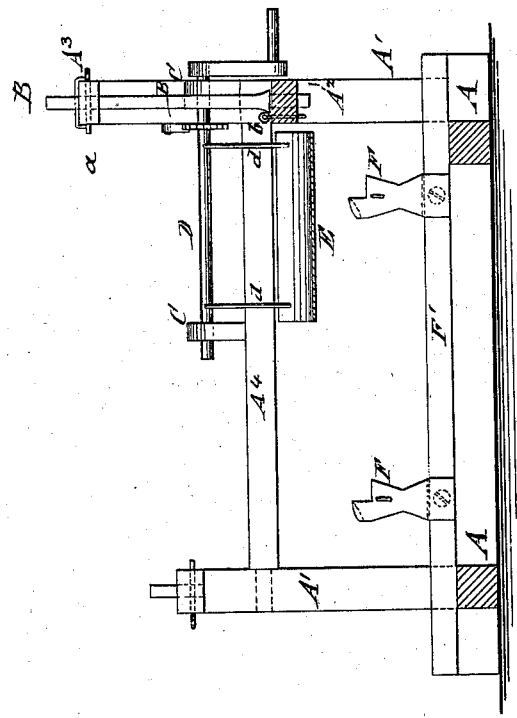
WITNESSES:
INVENTOR:
J. Bowman
S. C. Irving
BY
ATTORNEYS.

UNITED STATES PATENT OFFICE.

JOHN BOWMAN AND SAMUEL C. IRVING, OF GREENBUSH, ILLINOIS.

IMPROVEMENT IN ANIMAL-STOCKS.

Specification forming part of Letters Patent No. 192,672, dated July 3, 1877; application filed March 24, 1877.

*To all whom it may concern:*

Be it known that we, JOHN BOWMAN and SAMUEL C. IRVING, of Greenbush, in the county of Warren and State of Illinois, have invented a new and Improved Animal-Stock, of which the following is a specification:

In the accompanying drawing, Figure 1 represents a vertical longitudinal section on line $x\ x$, Fig. 2, of our improved apparatus for shoeing horses, and Fig. 2 is a sectional end elevation of the same.

Similar letters of reference indicate corresponding parts.

The invention consists in making an animal-stock with independent foot-rests to permit the feet of the animal to be operated upon at the same time by different persons, as hereinafter described.

In the drawing, A represents a platform, of suitable size, which supports, on uprights $A^1$, a lateral end cross-piece, $A^2$, and a slotted top piece, $A^3$, to which the swinging bars B are applied, they being seated by their pointed lower ends in sockets of the lower cross-bar, and secured by spring-pins or cross-bolts $a$ to the top piece. They are swung sidewise for introducing the head of the horse or mule, and are then fastened close to the head by the cross-bolts $a$, so as to retain the head firmly in position between them.

To the rollers D are attached strong cords $d$, which carry a leather apron, E, that is placed below the body of the horse after the longitudinal pieces $A^4$ have been replaced in position at both sides of the same. The horse is then hoisted, by turning the cranks, to the proper height, and the feet fastened by suitable straps to the blocks F, which are adjustable, by bottom grooves and set-screws, on longitudinal bottom rails $F'$. The stocks F are concaved at the top for the feet, and provided with side staples for the fastening-straps.

The shoes are applied to the feet when the horse is in hoisted position, and the nails clinched and the shoeing finished, or the horse may be lowered and the finishing operation completed when the same is in natural position.

The apparatus is simple and readily handled, and the horse brought thereby fully within control without danger or trouble.

Having thus described our invention, we claim as new and desire to secure by Letters Patent—

An animal-stock, whose foot-rests are independent and separately adjustable, as shown and described, to allow the feet to be operated upon simultaneously.

JOHN BOWMAN.
SAMUEL C. IRVING.

Witnesses:
  WM. RANDALL,
  G. W. CUNNINGHAM.